Patented June 17, 1930

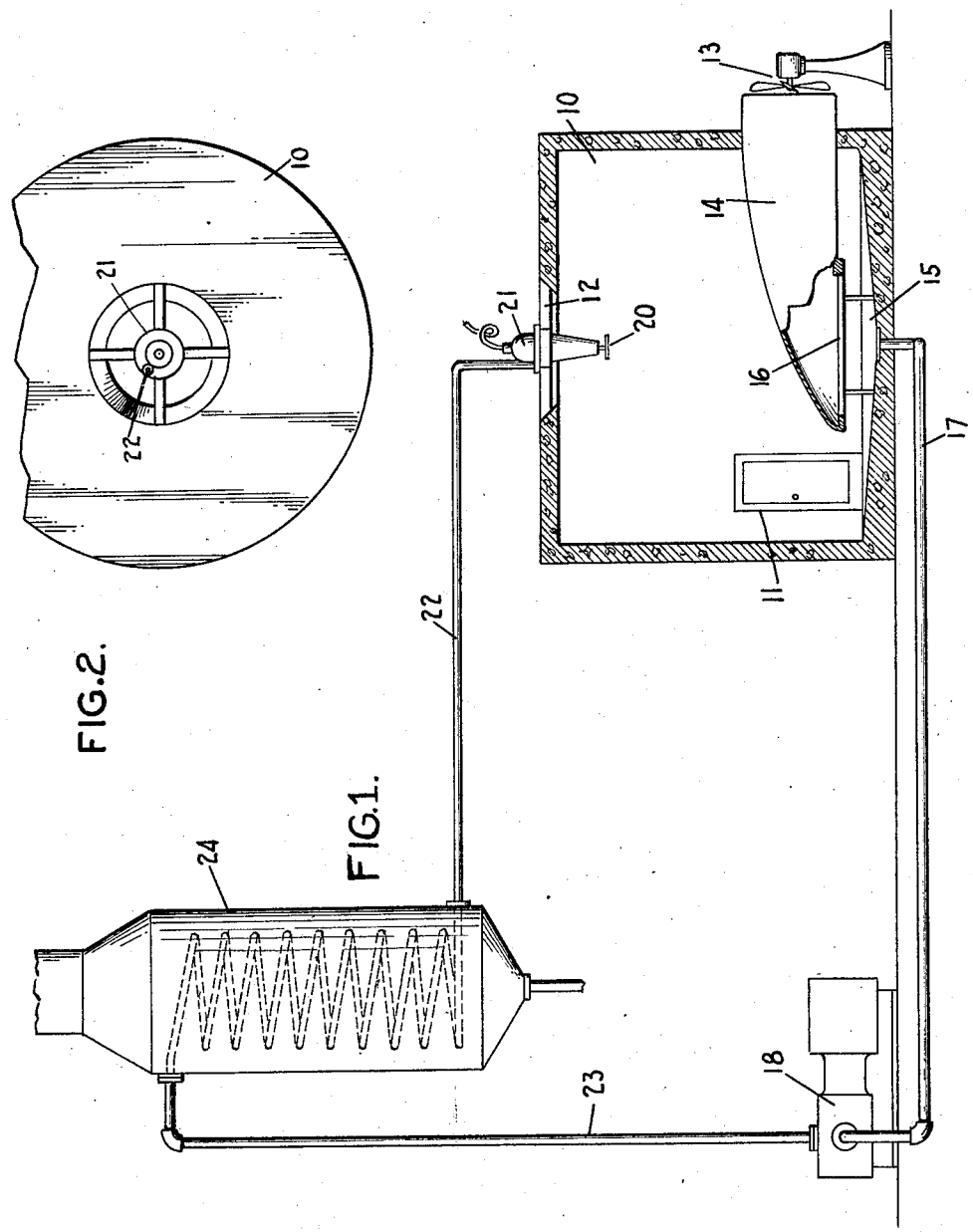

1,765,001

UNITED STATES PATENT OFFICE

WILLIAM SPENCER BOWEN, OF WESTFIELD, NEW JERSEY

COOLING TOWER

Application filed May 1, 1929. Serial No. 359,441.

The invention relates to apparatus for cooling liquids such as the cooling water discharged from condensers and the like. Heretofore, this has been effected by means of spray cooling ponds or by towers wherein the water is arranged to pass over a large surface area with natural or forced draft directed either concurrently or, generally, countercurrently with respect to the flow of the water. In the former construction, considerable waste of water results, more especially when an appreciable breeze is blowing, as the fine spray of water resulting from the use of spray nozzles in this system readily drifts away. The tower arrangements with water drip are generally constructed of wood, involve a very considerable expense and are comparatively short-lived, although there is an appreciable saving in water in the use of this type over the former.

The present invention has for its object a closed tower of substantial construction and affording a controlled air current wherein the water is cooled, in finely divided state, without the attendant loss of water and nuisance due to the drifting of the spray about the surrounding neighborhood, thus effecting an appreciable saving in the cooling water. A further object of the invention is to provide for the rapid lowering of the temperature of the incoming hot water in the form of spray; also, to reduce to a minimum the air required for the cooling with consequent reduction of power consumed in supplying the same.

In carrying out the invention, the water to be cooled is introduced into a chamber wherein the same is confined during the entire operation of cooling, this chamber being preferably of very substantial construction. It may be, for example, of the reinforced concrete type and into which the water is introduced in finely divided state at the top together with the air for cooling the same which may enter through a direct opening of said tower to the atmosphere, the air being positively drawn concurrently with the falling water through said tower by suitable means such as a suction fan or the like communicating with the interior of the tower.

Provision is made for removing the cooled water which collects at the bottom of the tower and for returning the same to a condenser or other apparatus, from which it originally came, to repeat the cycle, a small portion, of course, leaving the tower with the effluent gas or air used for cooling. The arrangement of the spray production and the introduction of the air or other cooling medium thereto is preferably such that the air at a relatively high velocity strikes the spray substantially at right angles and effects thereby a very rapid cooling of the water so that comparatively low towers may be utilized, rather than the high towers heretofore necessary where the water is required to flow over a large surface area. Moreover, due to the fineness of the spray, a flash cooling is accomplished.

The nature of the invention, however, will best be understood when described in connection with the accompanying drawings, in which:

Fig. 1 is a more or less diagrammatic layout of the novel cooling system with the tower shown in vertical section; and Fig. 2 is a plan view of the cooling tower portion thereof.

Referring to the drawings, 10 designates a container of suitable size such as a cylindrical reinforced concrete chamber having a door 11, to admit of entrance to the interior of the chamber, and provided with an opening 12 in the top of said chamber. Air or other cooling fluid is to be positively drawn through this opening into the chamber as, for example, by means of a suction fan 13 placed at the outlet end of a duct 14 which passes through the lower portion of a side wall of the chamber 10 to the lower central portion of the chamber immediately above, but displaced from, a sump or the like 15 therein. An opening 16 into the duct 14 and located over the said sump serves to provide a current of air through the opening 12 and into and through the chamber 10, while the sump 15 is connected through a pipe 17 with a pump 18 for removal of cooled water in the bottom of the chamber 10 and collecting in the sump 15.

Centrally disposed at the opening 12 is a device for finely subdividing water or other liquid to be delivered into the interior of the chamber 10 for cooling. This device may comprise a centrifugal disintegrator member 20 located preferably below the opening 12 and operated, for example, by a self-contained electric motor 21 and of any well-known or special design, the liquid to be cooled being delivered to the disintegrator member through an inlet pipe 22. By means of this device, which may be of any well-known or special design, the liquid is finely subdivided into a cloud or spray which spreads laterally, or rather radially, therefrom toward the side walls of chamber 10, while the air, under the influence of fan 13, is drawn inwardly through opening 12 to meet said spray, preferably substantially at right angles, to intermingle therewith and effect a rapid lowering of the temperature of the water.

This water spirals in minute fog-like droplets to the bottom of the chamber 10 from which it is removed by the pump 18, as aforesaid, while the air or other cooling gas passes outwardly from the tower through the duct 14 with small amounts of entrained moisture. The cooled water may then be returned by the pump, as through a pipe 23, to condenser apparatus 24 for repeating the cycle, being delivered again from the condenser through pipe 22 to the disintegrator member 20.

No appreciable resistance to impede the flow is thereby offered either to the water or cooling gas passing through the chamber, thus reducing to a minimum the input power for the fan; and a very rapid cooling action is attained so that large volumes of water may be rapidly handled with relatively small size towers or chambers. It has been found, also, that with properly designed centrifugal disintegrators, extremely large volumes of water or other liquids may be finely subdivided per unit of time and subjected to the necessary volume of cooling air, thereby greatly enhancing the cooling efficiency. Moreover, since the cooling is conducted entirely within a closed chamber, little, if any, loss of the cooling water results; and the chamber, furthermore, being constructed of substantial thickness and of material of low specific heat, effectively protects the interior from freezing during cold weather.

I claim:

1. Cooling apparatus for liquids, comprising a closed chamber having an inlet opening at the top for the introduction of a cooling gas, a centrifugal disintegrating device for delivering the liquid into the chamber in finely subdivided condition and located axially with respect to said inlet opening of the chamber, the liquid being delivered therefrom below said inlet opening and substantially at right angles to its axis, and the said chamber being provided with a sump at the bottom for collection of the cooled liquid and with an outlet opening, a suction fan located at said outlet opening for positively drawing the cooling gas through the inlet opening and through said chamber, and means for effecting removal of the liquid from said sump.

2. Cooling apparatus for liquids, comprising a closed chamber having an inlet opening at the top for the introduction of a cooling gas, a centrifugal disintegrating device for delivering the liquid into the chamber in finely subdivided condition and located axially with respect to said inlet opening of the chamber, the liquid being delivered therefrom below said inlet opening and substantially at right angles to its axis, and the said chamber having a sump at the bottom for collection of the cooled liquid, an air duct mounted thereover and having an inlet opening above the sump and displaced therefrom, said duct extending through the side wall of the chamber, and a fan located at the outlet end of said duct for positively drawing the cooling gas through the inlet opening and through said chamber, and means for effecting removal of the liquid from said sump.

In testimony whereof I affix my signature.

WILLIAM SPENCER BOWEN.